(12) United States Patent
Li et al.

(10) Patent No.: US 10,078,827 B2
(45) Date of Patent: Sep. 18, 2018

(54) ITEM SUBSTITUTION FRAUD DETECTION

(71) Applicant: NCR Corporation, Duluth, GA (US)

(72) Inventors: Jun Li, Marietta, GA (US); Sik Piu Kwan, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 250 days.

(21) Appl. No.: 14/673,832

(22) Filed: Mar. 30, 2015

(65) Prior Publication Data
US 2016/0292661 A1 Oct. 6, 2016

(51) Int. Cl.
| | |
|---|---|
| *G06Q 20/20* | (2012.01) |
| *G07G 1/00* | (2006.01) |
| *G06K 9/00* | (2006.01) |
| *G06K 9/62* | (2006.01) |
| *G06T 7/00* | (2017.01) |
| *H04N 7/18* | (2006.01) |
| *G06K 9/46* | (2006.01) |

(52) U.S. Cl.
CPC ....... *G06Q 20/208* (2013.01); *G06K 9/00771* (2013.01); *G06K 9/4633* (2013.01); *G06K 9/6211* (2013.01); *G06T 7/001* (2013.01); *G07G 1/0018* (2013.01); *G07G 1/0063* (2013.01); *H04N 7/181* (2013.01); *G06T 2207/30108* (2013.01)

(58) Field of Classification Search
CPC .............................. G06Q 30/00; G06K 7/1456

USPC ............................................ 235/375; 705/23
See application file for complete search history.

(56) References Cited

U.S. PATENT DOCUMENTS

| | | | |
|---|---|---|---|
| 8,196,822 B2 | 6/2012 | Goncalves | |
| 8,494,909 B2 | 7/2013 | Goncalves | |
| 9,129,277 B2 | 9/2015 | MacIntosh | |
| 2003/0160760 A1* | 8/2003 | Takakura | H04N 1/3876 345/158 |
| 2010/0067805 A1* | 3/2010 | Klefenz | G06K 9/00818 382/201 |
| 2013/0223673 A1* | 8/2013 | Davis | G06K 9/78 382/100 |
| 2014/0267803 A1* | 9/2014 | Shintani | H04N 5/23293 348/208.2 |

\* cited by examiner

*Primary Examiner* — Rokib Masud
(74) *Attorney, Agent, or Firm* — Schwegman, Lundberg & Woessner

(57) ABSTRACT

Various embodiments herein each include at least one of systems, methods, software, and devices, such as product scanners e.g., barcode scanners) enabled to detect item substitution fraud during a checkout process at facilities, such as retail outlets. One method embodiment that may be performed in part on a product scanner, includes detecting, on a point-of-sale (POS) terminal, an event occurrence associated with at least one validation process. The method may then receive an image from each of at least one camera of a plurality of cameras of the product scanner. The method further includes processing at least one of the received images according to the at least one validation process to obtain a result and providing the result to the POS terminal.

17 Claims, 5 Drawing Sheets

ITEM SUBSTITUTION FRAUD DETECTION

BACKGROUND INFORMATION

Retail shrink mostly comes from customers stealing, cashier sweet-hearting, and employee theft. Item substitution fraud occurring at Self-Service Checkout (SSCO) and Point-Of-Sale (POS) terminals is one of the key shrink issues. Perpetrators commit the fraud by checking out an expensive item (e.g., a bottle of bourbon) as a cheap produce item (e.g., banana). For example, rather than scanning a barcode of an item, the item is placed on a scale, an item type is keyed in or otherwise selected such as bananas, and the item is priced at checkout by weight rather than by the product barcode.

Previous product identification approaches have relied on item databases including reference product image(s) and feature data. These solutions require extensive computational resources and large databases, which results in more expensive SSCO and POS terminal hardware and slower system performance. Some efforts have been made in texture-based produce classification techniques to verify produce items, but these efforts have failed to provide reliable results. Additionally, specular reflection (e.g., glare) is an issue in all of these image-based efforts as specular reflection has confounded reliable results due at least to specular reflection obscuring features of presented items that are utilized by their respective algorithms.

SUMMARY

Various embodiments herein each include at least one of systems, methods, software, and devices, such as product scanners (e.g., barcode scanners) enabled to detect item substitution fraud during a checkout process at facilities, such as retail outlets.

One method embodiment that may be performed in part on a product scanner, includes detecting, on a point-of-sale (POS) terminal, an event occurrence associated with at least one validation process. The method may then receive an image from each of at least one camera of a plurality of cameras of the product scanner. The method further includes processing at least one of the received images according to the at least one validation process to obtain a result and providing the result to the POS terminal.

Another method embodiment is performed on a product scanner. This method includes receiving an image from each of at least one camera of a plurality of cameras of the product scanner. The method further includes processing a number of the received images, wherein the number of images processed when the number of images received is greater than one is at least one less than the number of images received. The processing of the images may include down sampling each image to a lower resolution and subtracting a background reference image from a current image. The background reference image subtracted is of an identical resolution and was captured by a respective camera that captured the current image. The processing of the images further includes performing a pixel-by-pixel comparison between reference image pixels and current image pixels and removing the pixel from the current image when the difference between current image pixel value and the reference image pixel value is lesser than a threshold value, the threshold value variable determined based on the value of one of the current image and reference image pixel values. The threshold value may be variable, the threshold determined based on the value of one of the current image or reference image pixel values. The image processing then performs at least one validation process against one of the images from which the background has been removed to obtain a result and provides the result to a Point-Of-Sale (POS) terminal.

A further embodiment is in the form of a product scanner. The product scanner includes at least one camera, at least one data communication interface device, and at least one data processing device. The product scanner further includes at least one memory device that stores a background reference image for each of the at least one cameras and stores instructions executable by the at least one data processing device to perform data processing activities. The data processing activities may include receiving an image from each of the at least one cameras and processing a number of the received images. The processing of the images may include down sampling each image to a lower resolution and then subtracting the background reference image from a current image. The background reference image that is subtracted is of an identical resolution and captured by a respective camera that captured the current image. The image processing may then perform a pixel-by-pixel comparison between reference image pixels and current image pixels and removing the pixel from the current image when the difference between current image pixel value and the reference image pixel value is lesser than a threshold value, the threshold value variable determined based on the value of one of the current image and reference image pixel values. The threshold value is variable in some embodiments and may be determined based on the value of one of the current image or reference image pixel values. The image processing may then performing at least one validation process against one of the images from which the background has been removed to obtain a result and provide the result to a Point-Of-Sale (POS) terminal via the at least one communication interface device of the product scanner.

DETAILED DESCRIPTION

Figure 1:
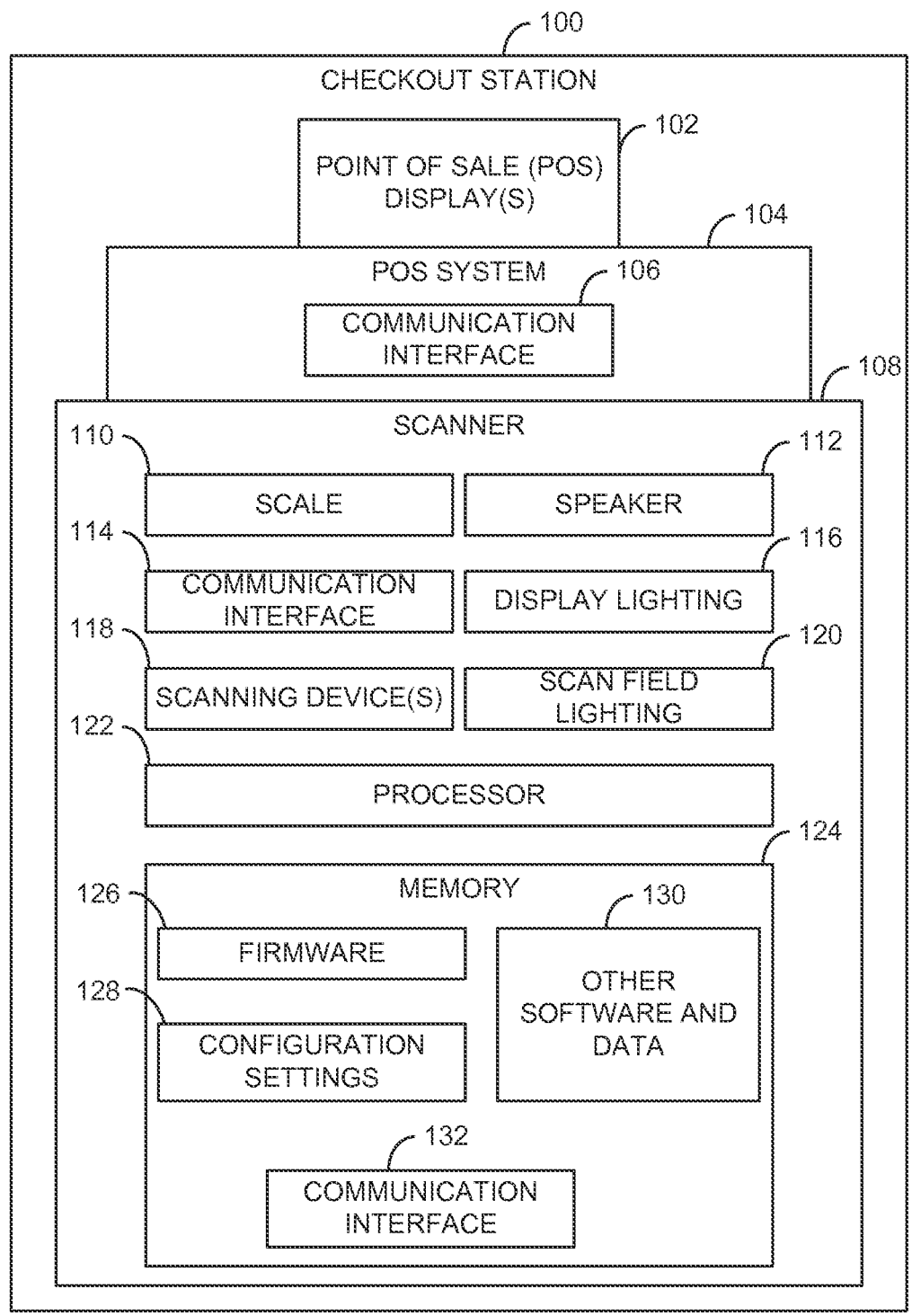
FIG. 1 is a diagram illustrating components of a checkout station having a scanner, according to an example embodiment.

Various embodiments herein each include at least one of systems, methods, software, and devices, such as product scanners (e.g., barcode scanners), enabled to detect item substitution fraud during a checkout process at facilities, such as retail outlets. Such embodiments provide reliable results in identifying mismatches between items presented at checkout, such as between a presented man-made item and a produce item keyed in or otherwise selected on a SSCO or POS terminal, where previous efforts have proven unreliable.

Some such embodiments include efficient algorithms to enable a product scanner, such as the NCR RealScan 7879 Bi-Optic Imager available from NCR Corporation of Duluth, Ga., to detect item substitution fraud in real-time.

Note that item substitution fraud is sometimes referred to as bourbon item substitution fraud. The algorithms of some embodiments achieve an outstanding sub one-second real-time performance by not using an item database, thus, avoiding lengthy database searches and record matching. Instead, the algorithms of some embodiments use insightful, yet lean image processing techniques to swiftly identify the presence, or lack thereof, of certain features present in one or more collected images of an item presented at checkout. Some embodiments may fuse together identified features to boost detection accuracy against item substitution fraud.

Some embodiments are built upon one or a combination of image feature identification algorithms. The image feature identification algorithms, in some embodiments, include one or more of variable brightness-to-noise thresholds to isolate the foreground, silhouette-based models to detect the presence of a relatively matching silhouette, statistical-based models to differentiate specular reflections from presented and expected items, and a Hough transform to identify line features from partially occluded presented items.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, Application Specific Integrated Circuit (ASIC), microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a diagram illustrating components of a checkout station 100 having a scanner 108, according to an example embodiment. It is to be noted that the checkout station 100 is shown schematically in greatly simplified form, with example components relevant to understanding various embodiments herein. The same situation may be true for the other various components of the checkout station 100. Also note that the checkout station 100 may include more or fewer components in some embodiments.

Furthermore, the various components included in the FIG. 1 as illustrated and arranged are provided for illustration purposes only. It is to be noted that other arrangements with more or fewer components are possible without departing from the contributions herein, in particular with regard to automatic and remote scanner configuration.

Moreover, the methods and scanner presented herein and below may include all or some combination of the components shown in the context of the checkout station 100. Further, although a checkout station 100 is illustrated as including a scanner 108, the scanner 108 may be a stand-alone element or an element of other systems, devices, and terminals in other embodiment. Examples of other terminal-types that may include a scanner 108 are self-service terminals (SSTs) such as SSCO terminals, POS terminals, clerk operated and self-service library checkout stations, time-keeping terminals, and the like. Additionally, references to POS terminals herein and in the claims are general references to both POS and SSCO terminals, unless expressly stated otherwise.

The methods of some embodiments are programmed as executable instructions stored in memory and/or non-transitory computer-readable storage media and executed on one or more processors associated with the components and devices herein.

The checkout station 100 includes one or more POS displays 102 that present information of a POS system 104 coupled to the one or more POS displays. Information presented by the one or more POS displays includes information relevant in a retail context and with regard to operation of the checkout station. The checkout station 100 also includes the scanner 108.

The scanner 108 may be referred to as a barcode scanner as that is the task most commonly associated with such devices. During operation of the checkout station 100, items are placed within a scan field of the scanner 108. One or more scanning devices 118 of the scanner 108, such as one or more of cameras and laser scanners then scan a barcode and information read therefrom is communicated to the POS system 104. The POS system 104 then uses that data to identify the item placed within the scan field of the scanner 108 and performs an additional function. The additional function may include a price lookup and addition of the item to a list of items to be purchased, which may be presented on the one or more POS displays 102.

The scanner 108 may include one or more scan fields, such as two scan fields of bi-optic scanners that are commonly seen in grocery and discount retail outlets. Each scan field may include one or more imaging devices 118, such as cameras. In some embodiments, a total of four or more cameras may be included in one or both of the scan fields, combined. In addition to the scanning devices 118, the scanner 108 may include various other components. The various other components may include an integrated scale 110 such as may be used in a grocery outlet to weigh items such as produce and one or both of a speaker 112 and display lighting 116 to output audio a visual signals such as signals of (un)successful scans. The scanner 108 may also include scan field lighting 120 that may be turned on and off and adjusted based on a detected presence of an item to be scanned. The scanner 108 also includes one or more of at least one of a hardware communication interface 114 or a software or firmware communication interface 132 that enables to scanner to communicate with at least the POS system 104 communication interface 106 and, in some embodiments, over a network.

During typical operation, the scanner 108 is operated according to instructions executed on a processor 122. The processor may be a single or multi-core ASIC, signal processor, microprocessor, or other type of processor. The instructions may be firmware 126 or software 130 stored in one or more memories 124. The one or more memories 124 may be or include volatile and non-volatile memories, write-protected memories, write-once memories, random access memory (RAM), read only memories (ROM), and other memory and data storage types and devices.

The instructions as may be stored in firmware 126 or as software 130 in memory 124 are typically executed according configuration settings stored in the memory 124. The configuration settings 128 configure operation of the scanner 108 and the various components therein. For example, the configuration settings 108 may configure speaker 112 volume, display lighting 116 outputs, scan field lighting 120 brightness, decoding algorithm of the scanning device(s) 118 and the instructions, one or more communication protocols used to communicate data from the scanner 108 to the POS system 104, such as via a wired or wireless communication interface 106 of the POS system 104, scale 110 operating parameters (e.g., unit of measure as pounds or kilograms), among other configuration settings the particular scanner 108 of an embodiment may include. In some embodiments, the configuration settings 128 may include a firmware version, a software version, and the like. Thus, when a configuration is set or updated, the setting or updating of the configuration settings 128 may include population and updates of any of the configuration settings 128 of a particular embodiment, including an update to firmware and software present on the scanner.

In some embodiments, the configuration settings 128 stored in the scanner 108 memory 124 may include configuration settings 128 for one or more item substitution fraud detection processes. The one or more item substitution fraud detection processes are process stored as software 130 or firmware 126 within the memory 124 or other device within the scanner 108. The item substitution fraud detection processes are typically triggered for execution upon receipt of a command from the POS system 104, such as upon receipt of input into the POS system 104 to weigh a presented item on the scale 110. The item substitution fraud detection processes, which may be executed by the processor 122, operate against images received from the one or more scanning device 118 cameras. The item substitution fraud detection processes may be defined in the software 130 or firmware 126. In some embodiments, the item substitution fraud detection processes are generic processes that may be flexibly configured within the configuration settings. For example, some embodiments may include one or more item substitution fraud detection processes that are simply defined within the software 130 when the software 130 is authored. Some of these processes may be modified through the configuration settings 128. In some other embodiments, the item substitution fraud detection processes are a collection of different processes in the software 130 or firmware 126 that may be linked together by configuration settings 128 to form larger, conditional item substitution fraud detection processes. Regardless of the form and configuration of the item substitution fraud detection processes, the item substitution fraud detection processes generally process images captured by scanning device 118 cameras to identify features of presented items represented therein. In some embodiments, the item substitution fraud detection processes operate to determine whether a presented item is a manmade item or a produce item.

Determining whether an item is manmade generally includes identifying features in images that rarely, if ever, occur in natural products, such as produce. Such features may include straight lines, parallel lines, certain shape silhouettes, glare or an amount or size of glare occurrences, among other features.

Figure 2:
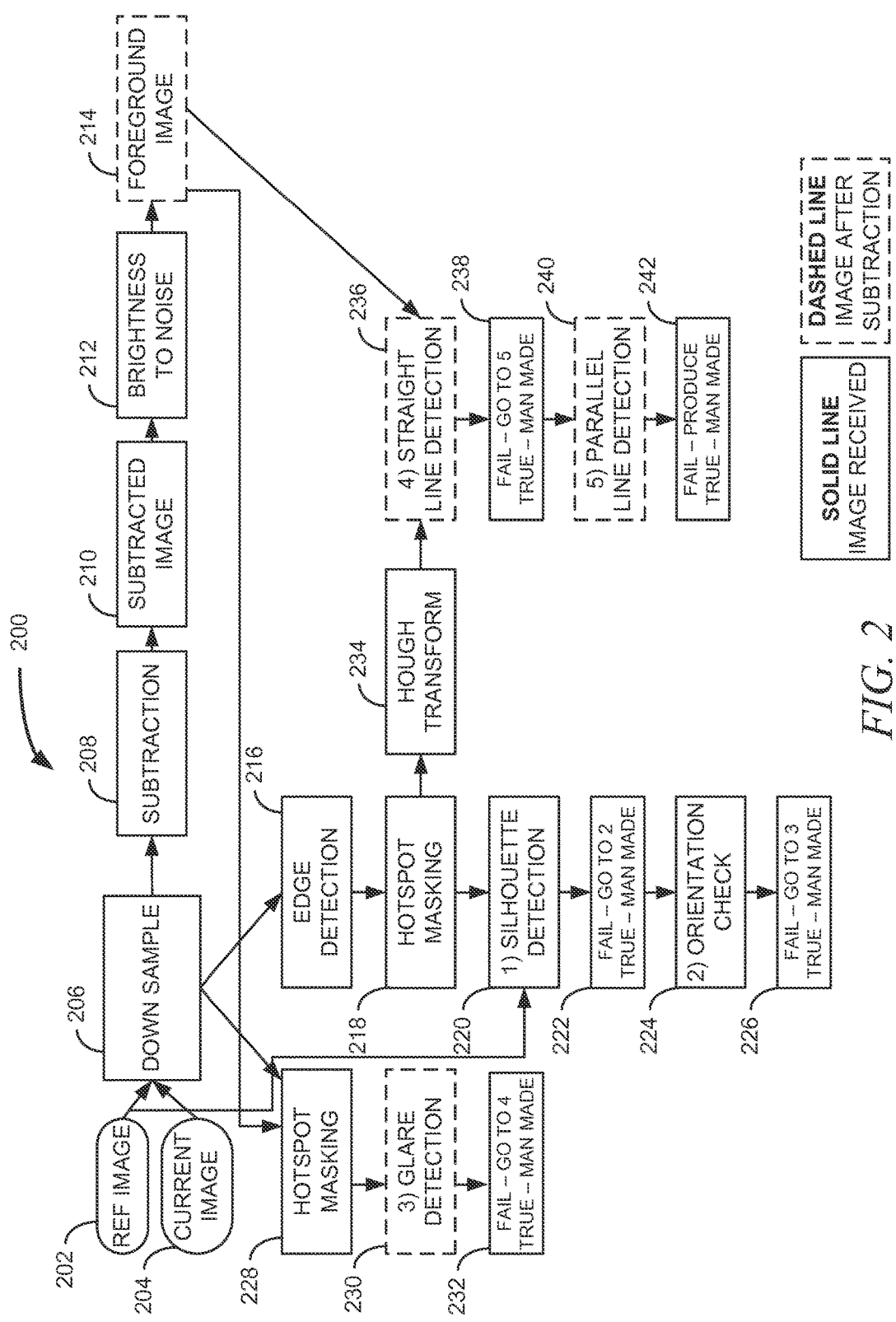
FIG. 2 is a block flow diagram of a method, according to an example embodiment.
Figure 3:
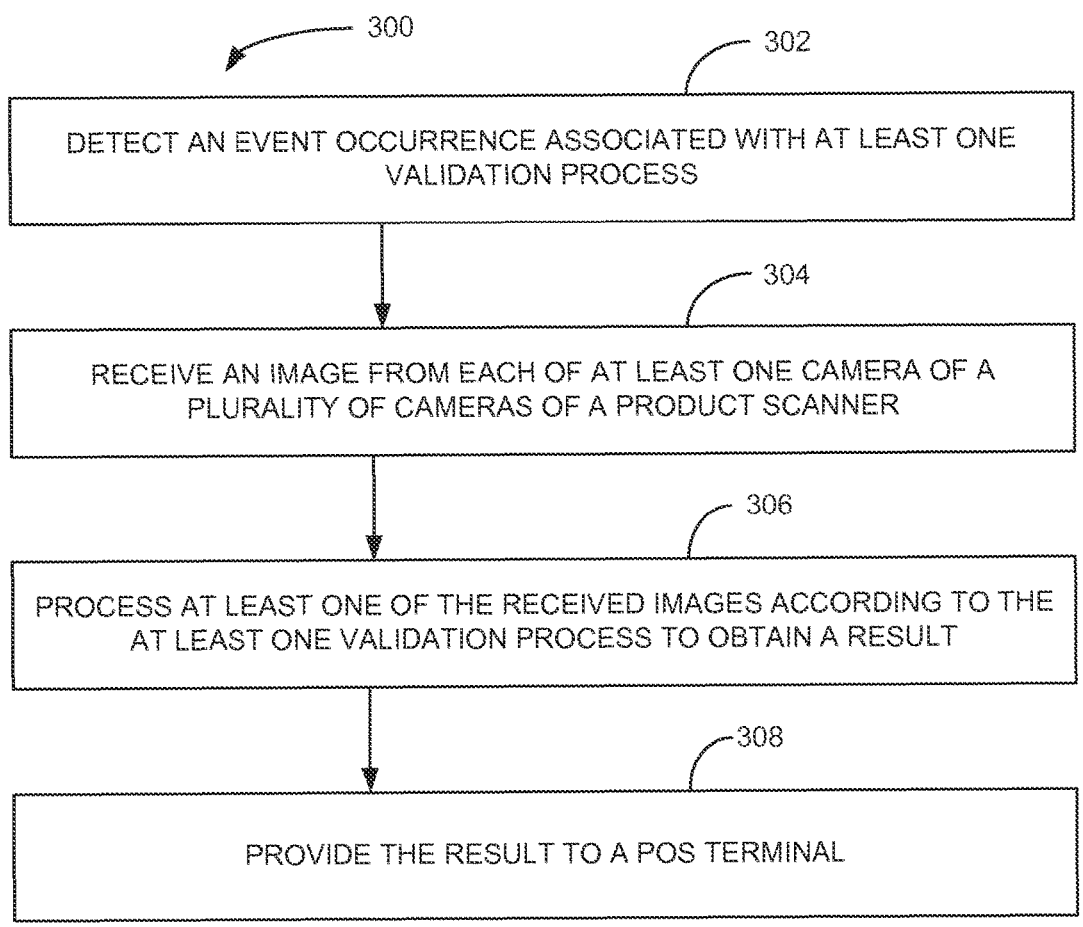
FIG. 3 is a block flow diagram of a method, according to an example embodiment.
Figure 4:
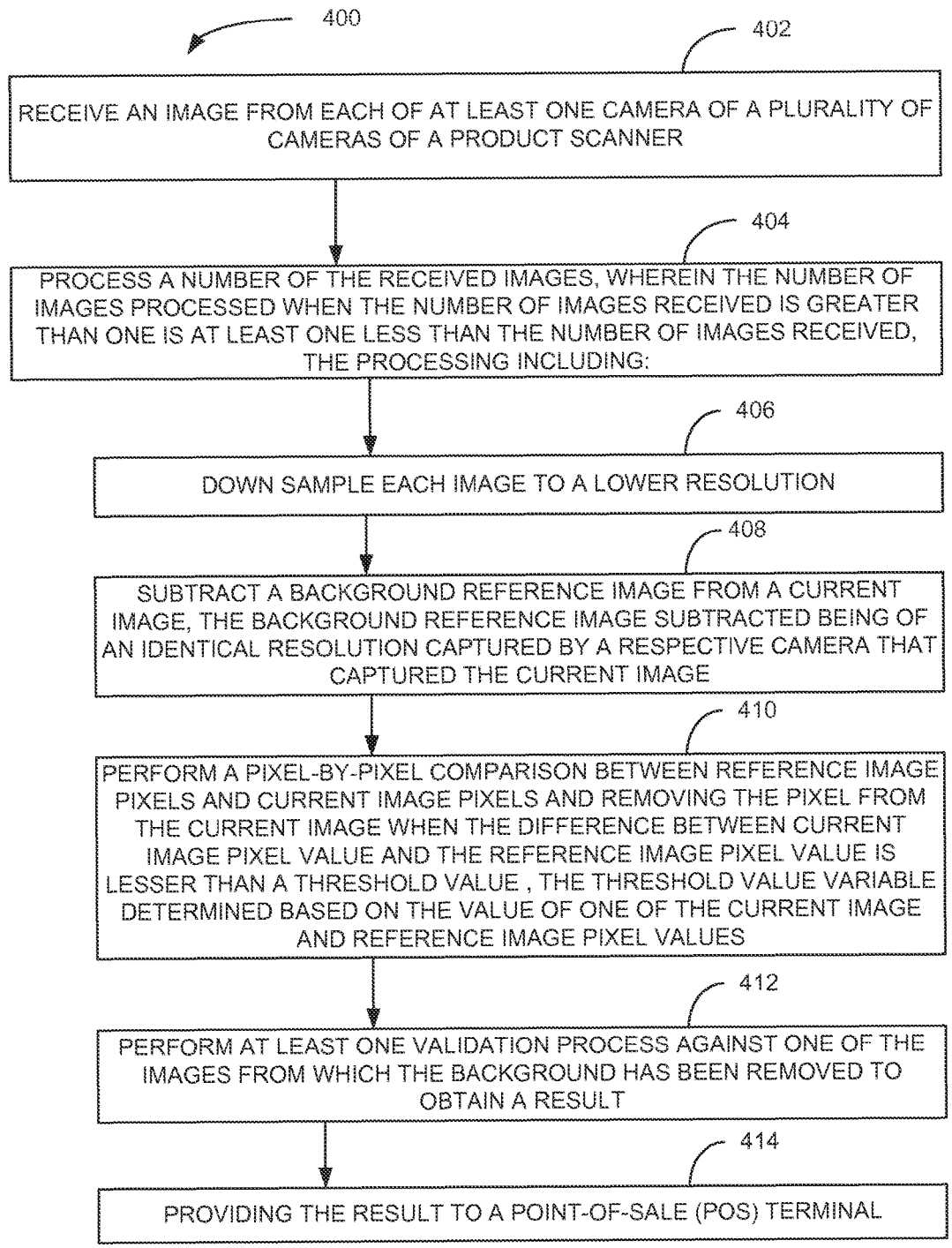
FIG. 4 is a block flow diagram of a method, according to an example embodiment.

Further details of example item substitution fraud detection processes are illustrated and described with regard to FIG. 2, FIG. 3, and FIG. 4.

FIG. 2 is a block flow diagram of a method 200, according to an example embodiment. The method 200 is an example of an item substitution fraud detection process made up of several sub-processes, which themselves may be referred to herein as processes. The method 200 may be defined in software or firmware within a scanner as described above. In some other embodiments, the method 200 may be defined in scanner configuration settings that reference and interrelate the included sub-processes. In some embodiments, the method 200 is defined to determine if an item presented at a POS terminal, which may be a SSCO, is an item of produce or is a man-made item. The method 200 may be triggered on a scanner by a signal from the POS terminal upon receipt of input indicating an item presented is produce. When the item presented is determined by the scanner to be man-made rather than produce, a signal is returned by the scanner to the POS terminal and the POS terminal may perform one or more actions, such as not accepting the item, freezing the POS terminal, sending a signal to one or more facility employees, and the like to prevent the possible fraud in the checkout transaction. When the item presented is determined by the scanner to in fact be an item of produce, an appropriate signal is returned by the scanner to the POS terminal to allow the checkout process to continue.

The method 200 includes receiving at least one reference image 202 and at least one current image 204. As a scanner may include a plurality of cameras, the number of reference images 202 and current images received may be dependent upon the number of cameras, in some embodiments. In typical embodiments, a reference image 202 is stored in a scanner memory for each scanner camera. A reference image 202 is an image captured by a respective camera at a time when no items are present within the field of view. A reference image 202 therefore generally is a representation of a background that will be included in a current image captured by the respective camera. Thus, in some embodiments, when a current image 204 is received from a camera, a reference image 202 for the respective camera can be retrieved from memory and is therefore received by the method 200.

The current image 204 may then be down sampled 206 to a lower resolution. The reference image 202 may also be equally down sampled 206 in some embodiments. However, the reference image 202 may have been previously down sampled 206 in some embodiments. In some embodiments, the down sampling 206 is a pyramidal down sampling that is performed in a 2×2 manner to combine vertically adjacent pixels and horizontally adjacent pixels. The down sampling 206 may be performed once, twice, three, four, or more times, depending on the size of the received current image 204 and reference image 202, when the reference image is down sampled 206. The amount of down sampling 206 performed may also be dependent upon the amount of processing resources and utilization load of processing resource on the scanner performing the method 200.

After the down sampling 206 is complete, the reference image 202 may be subtracted 208 from the current image 204. As the current image 204 is captured by the same camera as the reference image 202, the current image includes a presented item and background therein. The subtracting 208 therefore may identifying pixels between the two images that have identical values and remove those pixels from the current image 204. The result is a subtracted image 210 that includes only the presented item and other things that are in the current image but not previously present in the reference image 202, such as a portion of a body of a person presenting the item.

The subtracted image 210 is then processed by a brightness-to-noise process 212. The brightness to noise process 212 performs a pixel-by-pixel comparison of pixel values between pixels of the subtracted image 210 and corresponding pixels of the reference image 202. In some embodiments, when a difference between two pixels reveals the subtracted image 210 pixel having a brightness value greater than the corresponding reference image 202 pixel by an amount less than a threshold, the pixel is removed from the subtracted image 210. This threshold, in some embodiments, is variable based on a brightness value of the pixel in either the reference image 202 or the subtracted image 210. For example, the threshold may be determined in whole or in part as a percentage of the brightness of one of these pixels. This may be a five percent threshold in some embodiments, such that the difference in brightness value must be more than five percent of a brightness value of the reference image 202 pixel. Once the pixel-by-pixel comparison is complete, a foreground image 214 remains that includes only an item presented.

Next, or in parallel to the described operations of the method 200 since the reference image 202 and current image 204 were down sampled 206, the method 200 includes performing edge detection 216 processing on the current image 204. The edge detection 216 processing may be performed against a copy of the current image 204 as received or against a down-sampled 206 copy. Hotspot masking 218 may then be performed to adjust pixel brightness in areas of the image being processed to adjust for known bright areas of the image. The hotspot masking 218, in some embodiments, may adjust pixel brightness higher or lower. The hotspot masking 218 may be performed according to one or more configuration settings in some embodiments. At this point, the image will include edges of items present in the original received current image 204 with the edge represented as lines, Next, silhouette detection 220 is performed on the image in view of one or more reference models of man-made items, and other items in some embodiments. The one or more reference models utilized by the silhouette detection 220 each include a silhouette of interest, such as a silhouette of a man-made item, which may be silhouette of a bottle, a box, or other item. A reference model utilized in silhouette detection 220 may also be referred to as a model or a silhouette model. The silhouette detection 220 operates to determine if a silhouette of a reference model is present as lines remaining in the image being processed. As a distance of an item present in a current image is dependent upon a distance from a camera that captured the image, a silhouette of a reference model may be scaled to determine of a match can be found at different relative sizes.

When no match is found by the silhouette detection 220, the process fails at 222 and the processing may continue to an orientation check 224. When a match is found, the method 200 outputs a signal at 222 to the POS terminal indicating the item is man-made, and therefore not an item of produce. The method 200 then ends. In embodiments where a plurality of current images 204 are being processed, the result of the silhouette detection 210 may need to be identical with regard to at least two or more of the current images 204 before determining whether the silhouette detection 220 fails or not at 222. In some embodiments, the method 200 only proceeds from the silhouette detection 220 to the orientation check 224 when at least one current image 204 has been successful in identifying a known silhouette of a reference model, but not enough to be classified as true. When no silhouettes are detected, the method may proceed to perform glare detection.

As described above, the orientation check 224 is performed when a silhouette was detected in at least one image. The orientation check 224 is performed to confirm a man-made item is present in an image for which a silhouette was identified, but not enough of the other images confirmed the silhouette. The orientation check 226 searches for other details within the image within which a silhouette was identified, such as the presence of text, a label, angle orientation of lines of the silhouette, and other such features that may be present in the image. When confirmation is made, the method 200 outputs a signal at 226 to the POS terminal indicating the item is man-made, and therefore not an item of produce. The method 200 then ends. However, if confirmation is not made, the method 200 proceeds from 226 to the glare detection 230 process.

Next, or again in parallel to the described operations of the method 200 since the reference image 202 and current image 204 were down sampled, the method 200 includes performing hotspot masking 228 on either the current image 204 as it was received or as down sampled 206. Hotspot masking 228 may be performed to adjust pixel brightness in areas of the image being processed to adjust for known bright or dark areas of the image. The hotspot masking 228, in some embodiments, may adjust pixel brightness higher or lower. The hotspot masking 228 may be performed according to one or more configuration settings in some embodiments.

Subsequently, the glare detection 230 process may be called following either the silhouette detection 220 or the orientation check 224, as described above. The glare detection 230 searches for a number of glare areas within the image output by the hotspot masking 228 process defined by pixels having a brightness greater than a certain value that occur in contiguous image areas having at least a certain length and width. When the number of such areas is sufficient in view of a glare detection threshold, the glare detection 230 process is satisfied and the method 200 outputs a signal at 232 to the POS terminal indicating the item is man-made, and therefore not an item of produce. The method 200 then ends. However, if the glare detection threshold is not satisfied, the method 200 proceeds from 232 to the straight-time detection 236 process.

At some point in the performance of the method 200 prior to execution of the straight line detection 236 process, a Hough transform 234 process is performed on an image copy output by the hotspot masking 218. The Hough transform 234 process is an image feature extraction process that identities lines in the image. The straight-line detection 236 process then evaluates lines located in the image by the Hough transform 234 process in view of a rule. The rule in some embodiments, which may be set in a configuration setting, looks for lines having a more than five lines with a length greater than 30 pixels. When there are more than five lines having a length greater than 30 pixels, the straight line detection 236 process is satisfied and the method 200 outputs a signal at 238 to the POS terminal indicating the item is man-made, and therefore not an item of produce. The method 200 then ends. However, the straight-line detection 236 process is not satisfied, the method 200 proceeds from 238 to the parallel line detection 240 process.

The parallel line detection 240 process operates against the image output by the Hough transform 234 process to determine whether there are at least two parallel lines having a length of at least ten pixels and separated by a distance of at least 25 pixels present in the image. The number of parallel lines, length thereof, and distance between may vary in different embodiments and may be configurable in some embodiments.

When satisfactory parallel lines are identified, the parallel detection 240 process is satisfied and the method 200 outputs a signal at 242 to the POS terminal indicating the item is man-made, and therefore not an item of produce. The method 200 then ends. However, if the parallel line detection 240 process is not satisfied, the method 200 proceeds outputs a signal at 242 to the POS terminal indicating the item is likely an item of produce and the method 200 ends.

The method 200 is merely one example of an item substitution fraud detection process that may be defined in and executed on a product scanner. The various elements of the method 200 may be fewer, greater, different, and performed in a different order, in various embodiments.

FIG. 3 is a block flow diagram of a method 300, according to an example embodiment. The method 300 is a method of item substitution fraud detection that may be performed in part on a product scanner in partnership with a POS terminal.

The method 300 includes detecting 302, on a point-of-sale (POS) terminal, an event occurrence associated with at least one validation process and triggering execution of an item fraud substitution fraud detection process on a product scanner. The event occurrence, in some embodiments, may be receipt of at least one product identifier, such as a UPC code or an item identifier keyed into the POS terminal or otherwise received as input into the POS terminal.

The method 300 then continues by executing on the product scanner by receiving 304 an image from each of at least one camera of a plurality of cameras of the product scanner. The method 300 then processes 306 at least one of the received images according to the at least one validation process to obtain a result. The product scanner then provides 308 the result to the POS terminal. In some other embodiments, the images are received 304 from the product scanner by the POS terminal and the POS terminal performs the entirety of the method 300.

In some embodiments of the method 300, the number of cameras present in the scanner is at least three and a number of images subjected to the processing 306 is at least one less than the number of cameras.

In some embodiments, the POS terminal receives the result and conditionally performs one of at least two possible data processing actions based upon the result. At least one of the data processing actions in some embodiments includes outputting at least a signal indicating that an item presented at the product scanner as captured in at least one received image likely does not match an item the POS system is expecting.

In some embodiments, the at least one validation process of the processing 306 includes a set of validation processes that each execute on the product scanner to identify one or more properties of an item presented at the product scanner as captured in at least one received image. In one such embodiment of the method 300, at least one validation process is performed with regard to at least one received image to remove a background of the image leaving the item presented at the product scanner. At least one additional validation process may then be performed that outputs the result. The result may include an indication of whether the presented item is a naturally occurring or man-made item. In some of these embodiment, the at least one additional validation process may include one or more of a silhouette detection process, a glare detection process, a straight line detection process, and a parallel line detection process.

The silhouette detection process processes an image to leave a silhouette of the presented item that is then compared to a reference model of a man-made item. When the silhouette detection process identifies a relative matched, the silhouette detection process outputs an indication the presented item is likely man-made. The glare detection process evaluates areas within the presented item image portion for distinct occurrences of glare. When a number of glare occurrences larger than a first threshold is greater than a second threshold, the glare detection process outputs an indication the presented item is likely man-made.

Prior to performing the straight line detection and parallel line detection processes, these embodiments of the method 200 include performing a Hough transform on the image of the presented item. One or both of the straight line and parallel line detection processes may then be executed on the image. When the straight line detection identifies a number of straight lines longer than a third threshold greater than a fourth threshold, the straight line detection process outputs an indication the presented item is likely man-made. When the parallel line detection identifies at least two parallel lines each having at least a minimum length and separated by at least a minimum distance, an indication that the presented item is likely man-made is output.

In some of these embodiments, at least one of the silhouette detection, glare detection, straight line detection, and parallel line detection processes are performed on at least two images and the output of the indication that the presented item is likely man-made is output only upon reaching the same conclusion through the respective process upon processing at least two images.

FIG. 4 is a block flow diagram of a method 400, according to an example embodiment. The method 400 is an example of an item substitution fraud detection process that may be performed on a product scanner. However, in some embodiments, the method 400 may instead be performed on another computing device, such as a computer of the POS terminal, on a cloud server, and the like.

The method 400 includes receiving 402 an image from each of at least one camera of a plurality of cameras of a product scanner and processing 404 a number of the received images. In some embodiments, the number of images processed 404 when the number of images received is greater than one is at least one less than the number of images received.

In some embodiments of the method 400, the processing 404 includes down sampling 406 each image to a lower resolution. A background reference image is then subtracted 408 from a current image. The background reference image subtracted 408 is typically of an identical resolution captured by a respective camera that captured the current image. The method 400 may then perform 410 a pixel-by-pixel comparison between reference image pixels and current image pixels. As part of performing 410 the pixel-by-pixel comparison between reference image pixels and current image pixels and removing the pixel from the current image when the difference between current image pixel value and the reference image pixel value is lesser than a threshold value, the threshold value variable determined based on the value of one of the current image and reference image pixel values. The threshold value may be variable and may be determined based on the value of one of the current image and reference image pixel values.

The method 400 may then continue by performing 412 at least one validation process, such as one or more of the validation processes described elsewhere herein, against one of the images from which the background has been removed to obtain a result. The result is then provided 414 to a POS terminal.

Figure 5:
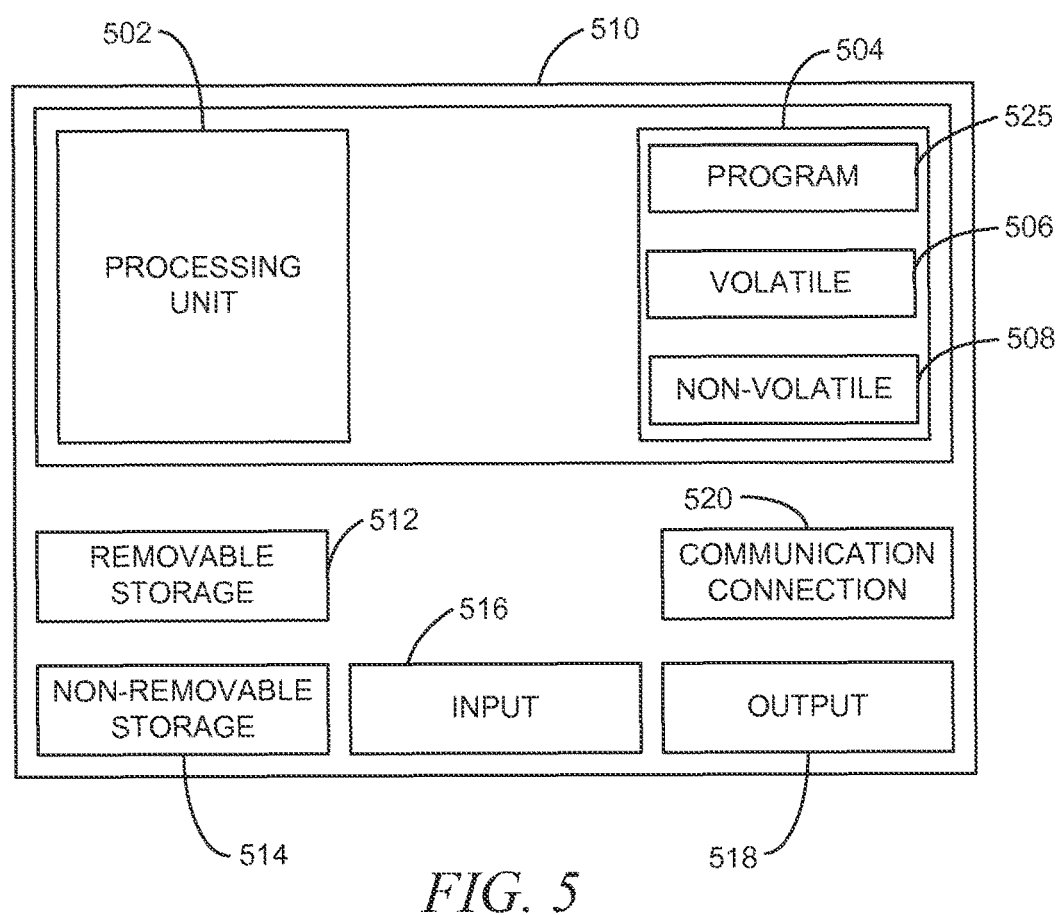
FIG. 5 is a block diagram of a computing device, according to an example embodiment.

FIG. 5 is a block diagram of a computing device, according to an example embodiment. The computing device is an example of a computing device that may be deployed as a POS system 104 within the checkout station 100 of FIG. 1. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Memory 504 may include volatile memory 506 and non-volatile memory 508. Computer 510 may include or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a non-transitory computer-readable medium. For example, a computer program 525 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 510 to provide generic access controls in a COM based computer network system having multiple users and servers.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    detecting, on a point-of-sale (POS) terminal, an event occurrence associated with an item having known characteristics;
    receiving an image from each of at least one camera of a plurality of cameras in response to the event occurrence;
    processing at least one of the received images to obtain item characteristics;
    determining according to at least one validation process whether the item characteristics are associated with the known characteristics of the item;
    providing a result of the at least one validation process to the POS terminal; and
    wherein at least one validation process is performed with regard to the at least one received image to remove a background of the image leaving only an image of a captured item and to perform at least one additional validation process that outputs the result, the result including an indication of whether the captured item is a naturally occurring or man-made item, the at least one additional validation process on the image of the captured item including at least one of:
        a silhouette detection process that processes the image of the captured item to leave a silhouette of the captured item which is then compared to a reference model of a man-made item and when relatively matched, outputting the indication the captured item is likely man-made;
        a glare detection process that evaluates areas within the image of the captured item for distinct occurrences of glare and when a number of glare occurrences larger than a first threshold is greater than a second threshold, outputting the indication the captured item is likely man-made; and
        performing a Hough transform on the image of the captured item and performing at least one of a straight-line detection process and a parallel line detection process, wherein:
            when the straight line detection identifies a number of straight lines longer than a third threshold greater than a fourth threshold, outputting the indication the captured item is likely man-made;
            when the parallel line detection identifies at least two parallel lines each having at least a minimum length and separated by at least a minimum distance, outputting the indication the captured item is likely man-made.

2. The method of claim 1, wherein the POS terminal is a self-service point-of-sale terminal.

3. The method of claim 1, wherein the processing of the at least one of the received images is performed by a product scanner.

4. The method of claim 3, wherein the product scanner includes the number of cameras and a number of images subjected to the processing is at least one less than the number of cameras.

5. The method of claim 1, wherein the POS terminal receives the result and conditionally performs one of at least two possible data processing actions based upon the result.

6. The method of claim 5, wherein at least one of the data processing actions includes outputting at least a signal indicating that the item characteristics are not associated with the item.

7. The method of claim 1, wherein the event occurrence is receipt of an item identifier associated with the item.

8. The method of claim 7, wherein the item identifier is received as at least one of manual POS terminal input and a scan of a Universal Product Code (UPC) by a product scanner.

9. The method of claim 1 performed by a product scanner.

10. The method of claim 1, wherein:
at least one of the silhouette detection, glare detection, straight line detection, and parallel line detection processes are performed on at least two images and the indication that the captured item is likely man-made is output only upon reaching the same conclusion through the respective process upon processing at least two images; and
when an output of only one of the silhouette detection, glare detection, straight line detection, and parallel line detection processes output the indication that the captured item is likely man-made with regard to only a single image, performing further processing with regard to that single image to identify at least one additional feature present therein to confirm that the captured item is man-made and outputting the indication that the captured item is likely man-made when the at least one additional feature is present in the image.

11. The method of claim 1, wherein removing the background of the at least one image includes:
down sampling each image to a lower resolution;
subtracting a background reference image from a current image, the background reference image subtracted being of an identical resolution and captured by a respective camera that captured the current image; and
performing a pixel-by-pixel comparison between reference image pixels and current image pixels and removing the pixel from the current image when the difference between current image pixel value and the reference image pixel value is lesser than a threshold value, the threshold value variable determined based on the value of one of the current image and reference image pixel values.

12. A method comprising:
receiving an image from each of at least one camera of a plurality of cameras of a product scanner; and
processing a number of the received images to obtain item characteristics, wherein the number of images processed when the number of images received is greater than one is at least one less than the number of images received, the processing including:
down sampling each image to a lower resolution;
subtracting a background reference image from a current image, the background reference image subtracted being of an identical resolution captured by a respective camera that captured the current image; and
performing a pixel-by-pixel comparison between reference image pixels and current image pixels and removing the pixel from the current image when the difference between current image pixel value and the reference image pixel value is lesser than a threshold value, the threshold value variable determined based on the value of one of the current image and reference image pixel values;
determining according to at least one validation process whether the item characteristics are associated with a presented item;
providing a result of the at least one validation process to a Point-Of-Sale (POS) terminal; and
wherein at least one validation process is performed with regard to the at least one received image to remove a background of the image leaving only an image of a captured item and to perform at least one additional validation process that outputs the result, the result including an indication of whether the captured item is a naturally occurring or man-made item, the at least one additional validation process on the image of the captured item including at least one of:
a silhouette detection process that processes the image of the captured item to leave a silhouette of the captured item which is then compared to a reference model of a man-made item and when relatively matched, outputting the indication the captured item is likely man-made;
a glare detection process that evaluates areas within the image of the captured item for distinct occurrences of glare and when a number of glare occurrences larger than a first threshold is greater than a second threshold, outputting the indication the captured item is likely man-made; and
performing a Hough transform on the image of the captured item and performing at least one of a straight-line detection process and a parallel line detection process, wherein:
when the straight line detection identifies a number of straight lines longer than a third threshold greater than a fourth threshold, outputting the indication the captured item is likely man-made;
when the parallel line detection identifies at least two parallel lines each having at least a minimum length and separated by at least a minimum distance, outputting the indication the captured item is likely man-made.

13. The method of claim 12, wherein the method is performed on the product scanner.

14. The method of claim 13, wherein the method is performed upon receipt of a command from the POS terminal.

15. A product scanner comprising:
at least one camera;
at least one data communication interface device;
at least one data processing device; and
at least one memory device storing a background reference image for each of the at least one cameras and storing instructions executable by the at least one data processing device to perform data processing activities, the data processing activities comprising:
receiving an image from each of the at least one cameras; and
processing a number of the received images to obtain item characteristics, the processing including:
down sampling each image to a lower resolution;
subtracting the background reference image from a current image, the background reference image subtracted being of an identical resolution and captured by a respective camera that captured the current image; and performing a pixel-by-pixel comparison between reference image pixels and current image pixels and removing the pixel from the current image when the difference between current image pixel value and the reference image pixel value is lesser than a threshold value, the threshold value variable determined based on the value of one of the current image and reference image pixel values;

determining according to at least one validation process whether the item characteristics are associated with a presented item, the at least one validation process performed with regard to at least one down sampled image from which the background has been removed to obtain the result, the result including an indication of whether the presented item is a naturally occurring or man-made item, the at least one additional validation process including at least one of:

performing silhouette detection process that processes the image to leave a silhouette of the presented item which is then compared to a reference model of a man-made item and when relatively matched, outputting an indication the presented item is likely man-made;

performing glare detection process that identifies areas within the image for distinct occurrences of glare and when a number of glare occurrences larger than a first threshold is greater than a second threshold, outputting an indication the presented item is likely man-made; and performing a Hough transform on the image of the presented item and performing at least one of a straight-line detection process and a parallel line detection process, wherein:

when the straight-line detection identifies a number of straight lines longer than a third threshold greater than a fourth threshold, outputting an indication the presented item is likely man-made;

when the parallel line detection identifies at least two parallel lines each having at least a minimum length and separated by at least a minimum distance, outputting an indication the presented item is likely man-made; and providing the result to a Point-Of-Sale (POS) terminal via the at least one communication interface device.

16. The product scanner of claim 15, wherein the data processing activities are performed upon receipt of a command from the POS terminal, the command received via the at least one data communication interface device.

17. The product scanner of claim 15, wherein the at least one camera is four cameras and the number of images processed is three.

* * * * *